US008554605B2

(12) United States Patent
Oleson et al.

(10) Patent No.: US 8,554,605 B2
(45) Date of Patent: Oct. 8, 2013

(54) EVALUATING A WORKER IN PERFORMING CROWD SOURCED TASKS AND PROVIDING IN-TASK TRAINING THROUGH PROGRAMMATICALLY GENERATED TEST TASKS

(75) Inventors: David Oleson, San Francisco, CA (US); Alexander Sorokin, Foster City, CA (US); Greg Laughlin, San Francisco, CA (US); Vaughn Hester, San Francisco, CA (US); John Le, San Francisco, CA (US); Christopher R. Van Pelt, San Francisco, CA (US); Lukas A. Biewald, San Francisco, CA (US)

(73) Assignee: CrowdFlower, Inc., San Francisco, CA (US)

( * ) Notice: Subject to any disclaimer, the term of this patent is extended or adjusted under 35 U.S.C. 154(b) by 0 days.

(21) Appl. No.: 13/275,290

(22) Filed: Oct. 17, 2011

(65) Prior Publication Data

US 2013/0006717 A1     Jan. 3, 2013

Related U.S. Application Data

(60) Provisional application No. 61/502,815, filed on Jun. 29, 2011, provisional application No. 61/503,483, filed on Jun. 30, 2011.

(51) Int. Cl.
*G06Q 10/00* (2012.01)
*G06Q 99/00* (2006.01)

(52) U.S. Cl.
USPC ........ 705/7.41; 705/7.42; 705/319; 705/7.21; 705/7.13

(58) Field of Classification Search
None
See application file for complete search history.

(56) References Cited

U.S. PATENT DOCUMENTS 6,859,523 B1 *   2/2005   Jilk et al. ................... 379/32.01
6,938,048 B1     8/2005   Jilk et al.
(Continued)

FOREIGN PATENT DOCUMENTS

JP     2003084818 A    3/2003
JP     2003265863 A    9/2003
(Continued)

OTHER PUBLICATIONS

Torikka, Crowdsourcing Startup Microtask gets gamers to do some real work, Mar. 22, 2011; VentureBeat.*
(Continued)

*Primary Examiner* — Mark A Fleischer
*Assistant Examiner* — Octavian Rotaru
(74) *Attorney, Agent, or Firm* — Perkins Coie LLP

(57) ABSTRACT

Systems and methods for evaluating a worker in performing crowd sourced tasks and providing in-task training are disclosed. In one aspect, embodiments of the present disclosure include a method, which may be implemented on a system, for selecting a job distributed through a job distribution platform for workers to work on, for use to generate a test task, the job being associated with a known correct result, associating a manipulated result, known to be an incorrect result for the job, with the job to generate the test task, and/or presenting the job with the manipulated result as the test task to a worker for evaluation of work quality of the worker. The job distribution platform crowd sources tasks online to workers to work on via their respective computing devices.

14 Claims, 12 Drawing Sheets

(56) References Cited

U.S. PATENT DOCUMENTS

| | | | |
|---|---|---|---|
| 7,155,400 B1* | 12/2006 | Jilk et al. | 705/7.14 |
| 7,197,459 B1 | 3/2007 | Harinarayan et al. | |
| 7,778,865 B1 | 8/2010 | Kane | |
| 7,801,756 B1 | 9/2010 | Harinarayan et al. | |
| 7,885,844 B1 | 2/2011 | Cohen et al. | |
| 7,899,694 B1 | 3/2011 | Marshall et al. | |
| 7,945,470 B1 | 5/2011 | Cohen et al. | |
| 8,099,311 B2 | 1/2012 | La Vecchia et al. | |
| 8,170,897 B1* | 5/2012 | Cohen et al. | 705/7.13 |
| 8,255,258 B1* | 8/2012 | Cohen et al. | 705/7.21 |
| 2002/0069079 A1 | 6/2002 | Vega | |
| 2003/0050829 A1 | 3/2003 | Dietz et al. | |
| 2004/0098447 A1* | 5/2004 | Verbeke et al. | 709/201 |
| 2005/0154600 A1 | 7/2005 | Feygenson et al. | |
| 2006/0059490 A1 | 3/2006 | Knapp et al. | |
| 2007/0124363 A1 | 5/2007 | Lurie et al. | |
| 2008/0119134 A1 | 5/2008 | Rao | |
| 2008/0133270 A1 | 6/2008 | Michelson et al. | |
| 2008/0209431 A1* | 8/2008 | La Vecchia et al. | 718/104 |
| 2009/0070412 A1 | 3/2009 | D'Angelo et al. | |
| 2009/0210282 A1 | 8/2009 | Elenbaas et al. | |
| 2009/0234686 A1 | 9/2009 | Chakra et al. | |
| 2010/0017252 A1 | 1/2010 | Chaar et al. | |
| 2010/0057518 A1 | 3/2010 | Naveh et al. | |
| 2010/0069148 A1 | 3/2010 | Cargill | |
| 2010/0250359 A1 | 9/2010 | Gillenson et al. | |
| 2010/0317442 A1 | 12/2010 | Thomas | |
| 2011/0066556 A1 | 3/2011 | Kadosh | |
| 2011/0282793 A1 | 11/2011 | Mercuri et al. | |
| 2011/0313801 A1 | 12/2011 | Biewald et al. | |
| 2011/0313820 A1 | 12/2011 | Biewald et al. | |
| 2012/0029978 A1* | 2/2012 | Olding et al. | 705/7.42 |
| 2012/0053977 A1 | 3/2012 | Bagheri et al. | |
| 2012/0150579 A1 | 6/2012 | De Wit | |

FOREIGN PATENT DOCUMENTS

| | | | |
|---|---|---|---|
| JP | 2004192061 A | 7/2004 | |
| JP | 2007047926 A | 2/2007 | |
| JP | 2007141039 A | 6/2007 | |
| JP | 2008017946 A | 1/2008 | |
| KR | 20040053864 A | 6/2004 | |
| KR | 20060122236 A | 11/2006 | |

OTHER PUBLICATIONS

Ipeirotis, Quality Managements on Amazon Mechanical Turk; 2010 ACM 978-1-4503-0222-7.*

Alonso et al, Crowdsourcing for Relevance Evaluation, ACM, V42, N2, Dec. 2008 http://dl.acm.org/citation.cfm?id=1480508.*

Dawid et al, Maximum Likelihood Estimation of Observer Error-Rates Using the EM Alghorithm, Journal of Royal Statistical Society Series C, V28, N1, pp. 20-28, 1979 http://www.cs.mcgill.ca/~jeromew/comp766/samples/Output_aggregation.pdf.*

Dredze Mark, Annotating Named Entities in Twitter Data with Crowdsourcing, Proceedings of the NAACL HLT, pp. 80-88, Jun. 2010 http://ebiquity.umbc.edu/_file_directory_/papers/483.pdf http://dl.acm.org/citation.cfm?id=1866709.*

Eckert et al, Crowdsourcing the Assembly of Concept Hierarchies, ACM 978-1-4503-0085, Jun. 25, 2010 http://dl.acm.org/citation.cfm?id=1816143.*

Ipeirotis et al, Quality Management on Amazon Mechanical Turk, ACM 978-1-4503-0222-7, Jul. 25 2010 http://dl.acm.org/citation.cfm?id=1837906.*

Marge et al, Using the Amazon Mechanical Turk for Transcription of Spoken Language, Carnegie Mellon University, Jan. 1, 2010.*

Munro, Crowdsourcing and language studies—the new generation of linguistic data, Los Angeles, California, NAACL HLT, Jun. 6, 2010 http://www.aclweb.org/anthology-new/W/W10/W10-0700.pdf.*

Sheng et al, Get another label—Improving data quality and data mining using multiple, noisy labelers KDD 2008 http://citeseer.ist.psu.edu/viewdoc/summary?doi=10.1.1.144.6355 http://www.ipeirotis.com/wp-content/uploads/2012/01/kdd2008.pdf.*

International Search Report and Written Opinion for PCT/US2011/037626; Date of filing of Application: May 24, 2011; Date of Mailing: Jan. 17, 2012; 10 pages.

Hinds, et al., "Structures that Work: Social Structure, Work Structure and Coordination Ease in Geographically Distributed Teams" CSCW'06, Nov. 4-8, 2006, Banff, Alberta, Canada, pp. 343-352.

International Search Report and Written Opinion for PCT/US2011/037625; Date of filing of Application: May 23, 2011; Date of Mailing: Jan. 19, 2012; 10 pages.

Chen et al., "A Crowdsourceable QoE Evaluation Framework for Multimedia Content," MM'09, Oct. 19-24, 2009, Beijing, China, pp. 491-500.

Stross, R., "When the Assembly Line Moves Online," The New York Times.com, Oct. 30, 2010, 4 pages.

Torikka, M., "Crowdsourcing Startup Microtask Gets Gamers to Do Some Real Work," VentureBeat.com, Mar. 22, 2011, 7 pages.

International Search Report and Written Opinion for PCT/US2012/045321; Date of filing of Application: Jul. 2, 2012; Date of Mailing: Jan. 10, 2013; 10 pages.

International Search Report and Written Opinion for PCT/US2012/060659; Date of filing of Application: Oct. 17, 2012; Date of Mailing: Mar. 28, 2013; 12 pages.

Active Learning for Natural Language Processing NAACL, ISBN 978-1-932432-40-4, Onipress Inc, Jun. 5, 2009, 73 pages.

Crowdflower Business Listing Verification, YouTube webpages, Jun. 29, 2011, http://www.youtube.com/watch?v=68qd5e4JTpY, 1 page.

Kazai Gabriella, "An Exploration of the Influence that Task Parameters have on the Performance of Crowds," Microsoft 2010, http://www.crowdconf2010.com/images/finalpapers/kazai/pdf, 9 pages.

Oleson et al., "Programmatic Gold—Targeted and Scalable Quality Assurance in Crowdsourcing," AAAI Workshop 2011, 6 pages.

Biewald et al., "Ensuring quality in crowdsourced search relevance evaluation—the effects of training question distribution," SIGIR 10, Jul. 19-23, 2010, 4 pages.

Crowdflower, Youtube webpages, uploaded Mar. 30, 2010, http://www.youtube.com/watch?v=U408RYtcGc4, 4 pages.

Kern et al., "Statistical Quality Control for Human-Based Electronic Services," ICSOC 2010, LNCS 6470, pp. 243-257, Springer 2010, 10 pages.

Smucker et al, "The Crowd vs the Lab—A comparison of crowd-sourced and University Laboratory Participant Behavior," SIGIR 2011, 6 pages.

* cited by examiner

FIG. 7A

| | Gold | | |
|---|---|---|---|
| | No | Programmatic | Manual |
| Experiment #1 | 88% | 99% | 99% |
| Experiment #1 | 83% | 92% | N/A |

Table 1: Results accuracy: No gold, Manual and Programmatic gold

FIG. 7B

| Gold | Units | Accuracy | MAX work/worker | Gold Ratio | Time (hr) | Accuracy at confidence 1.0 |
|---|---|---|---|---|---|---|
| 10 manual | 213 | 95.0% | 100 | 1:10 | 4 | 100.0% |
| 60 programmatic | 3,004 | 89.0% | 1,000 | 1:17 | 5 | 96.0% |
| 208 programmatic | 3,103 | 94.0% | 1,500 | 1:8 | 9 | 97.0% |
| 233 programmatic | 15,509 | 92.5% | 1,500 | 1:7 | 27 | 97.0% |

Table 2: Scaling up with programmatic gold

US 8,554,605 B2

EVALUATING A WORKER IN PERFORMING CROWD SOURCED TASKS AND PROVIDING IN-TASK TRAINING THROUGH PROGRAMMATICALLY GENERATED TEST TASKS

CLAIM OF PRIORITY

This application claims the benefit of U.S. Provisional Application No. 61/502,815 filed Jun. 29, 2011 and entitled "PROGRAMMATIC GOLD TARGETED AND SCALABLE QUALITY ASSURANCE IN CROWDSOURCING," and U.S. Provisional Application No. 61/503,483 filed Jun. 30, 2011 and entitled "PROGRAMMATIC GOLD TARGETED AND SCALABLE QUALITY ASSURANCE IN CROWDSOURCING," the contents of which are incorporated by reference in its entirety.

CROSS-REFERENCES TO RELATED APPLICATIONS

This application is related to, and incorporates by reference, U.S. application Ser. No. 12/817,946 filed Jun. 17, 2010 and entitled "DISTRIBUTING A TASK TO MULTIPLE WORKERS OVER A NETWORK FOR COMPLETION WHILE PROVIDING QUALITY CONTROL," and U.S. application Ser. No. 12/817,979 filed Jun. 17, 2010 and entitled "USING VIRTUAL CURRENCY TO COMPENSATE WORKERS IN A CROWDSOURCED TASK."

This application is related to, and incorporates by reference, U.S. application Ser. No. 13/275,284 filed Oct. 17, 2011 and entitled "PERFORMANCE DATA IN A WORKER PROFILE AGGREGATED BY A JOB DISTRIBUTION PLATFORM FOR WORKERS THAT PERFORM CROWD SOURCED TASKS."

TECHNICAL FIELD

The disclosed technology relates generally to outsourcing or crowd sourcing jobs and tasks while providing scalable mechanisms for evaluating worker performance with in-task training.

BACKGROUND

Outsourcing mundane tasks and jobs to online labor around the globe has demonstrated potential in assisting entities and individuals complete a large amount of tasks in a time efficient manner. However, given the variability in labor pool, education level, age group, the results of the completed tasks are frequently less than ideal. Although entities could utilize crowd sourcing to have tasks completed in a short amount of time for a reasonable cost, the quality is typically highly variable and frequently unreliable.

Crowd sourcing is a growing industry, and online platforms exist for completion of tasks and microtasks. Labor-on-demand platforms provide APIs for application development and an international payment infrastructure for the deployment and implementation of crowd sourced tasks. Crowd sourcing has become a global phenomenon with a low barrier to entry. Millions of people around the world now participate in a digital and virtual workplace. However, the breadth and diversity among crowd sourcing participants, workers and researchers is immense and poses a challenge to implement adequate quality control mechanisms to account for a wide range of worker behavior: scammers, lazy workers, ethical workers, unethical workers, slow learners, etc. in a resource effective manner.

BRIEF DESCRIPTION OF THE DRAWINGS

FIG. 7A depicts a table illustrating worker result accuracy comparing when no test tasks are used, when test tasks are automatically generated from jobs, or with manually defined test tasks.

FIG. 7B depicts a table illustrating worker result accuracy comparing when no test tasks are used, when test tasks are automatically generated from jobs, or with manually defined test tasks.

DETAILED DESCRIPTION

Figure 1:
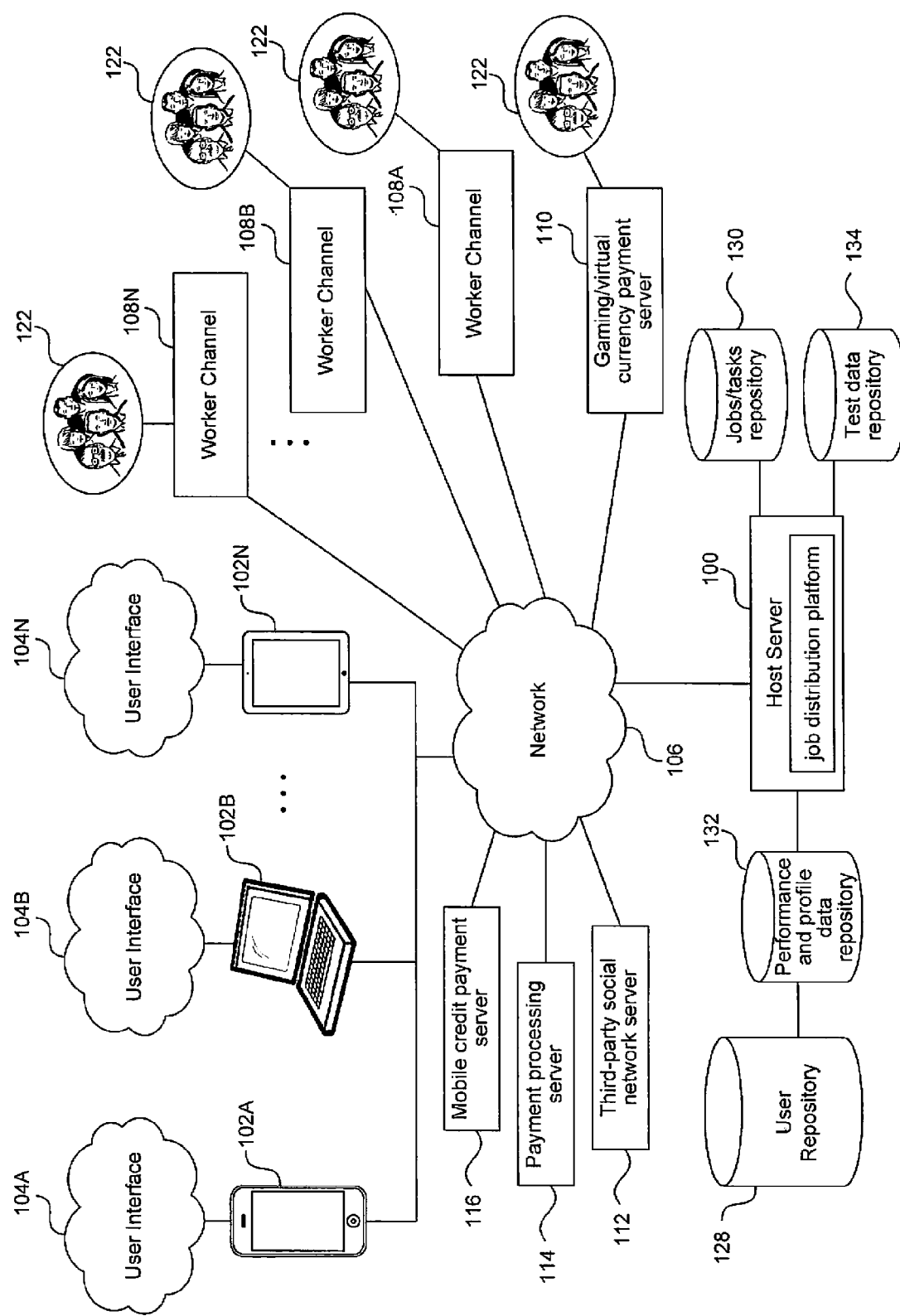
FIG. 1 illustrates an example block diagram of a host server of a job distribution platform that performs crowd sourcing by distributing tasks over a network to multiple workers and is able to evaluate workers in performing crowd sourced tasks and further provide in-task training.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for evaluating a worker in performing crowd sourced tasks and providing in-task training.

FIG. 1 illustrates an example block diagram of a host server 100 of a job distribution platform that performs crowd sourcing by distributing tasks over a network 106 to multiple workers 122 and is able to evaluate workers in performing crowd sourced tasks and further provide in-task training.

The client devices 102A-N can be any system and/or device, and/or any combination of devices/systems that is able to establish a connection with another device, a server and/or other systems. Client devices 102A-N each typically include a display and/or other output functionalities to present information and data exchanged between among the devices 102A-N and the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

The client devices 102A-N, worker channels 108, workers (or contributors) 122, gaming server 110, third party social network server 112, payment processing server 114, and/or mobile credit payment server 116, can be coupled to a network 106. In some embodiments, the devices 102A-N and host server 100 may be directly connected to one another.

In one embodiment, the host server 100 is operable to perform crowd sourcing services and/or to process crowd sourcing requests for entities (e.g., companies, organizations or other types of institutions) or users (e.g., individual or groups of users) via devices 102A-N. Workers (e.g., users or contributors) can access their jobs or assigned/distributed tasks via their own devices 102A-N, networked to the host server 100. The host server 100 can distribute a task to be crowd sourced to multiple workers (who may be located through various different channels 108A-N) and provide sophisticated quality control and cost management mechanisms, including tracking worker data over a period of time to provide an indication of worker preference, level of expertise, responsiveness, value of work, performance, speed, and other like performance/quality metrics for the worker or the generated work product.

In one embodiment, the host server 100 is further able to evaluate a worker's work quality, reliability in performing crowd sourced tasks via their own user devices 102A-N by intelligently generating evaluation or test tasks with known right answers or known false answers to be presented to a worker or potential worker (e.g., new worker being initially assessed for competency and usability) to see if the worker provides the correct response. The evaluation or test tasks can be generated (e.g., automatically or semi-automatically) from jobs actually submitted to and distributed through the job distribution platform of the host server 100 for completion by workers/contributors such that no additional resources need to be utilized for creation and management of test tasks. Moreover, in-task training of workers/contributors can be automated through use of test/evaluation tasks. Test task/evaluation task generation and management are described with further references to the examples of FIG. 4-10.

The host server 100 of the job distribution platform utilizes workers from multiple worker pools via different channels 108. The host server 100 can have a partnering relationship with one or more of the channels 108. Channels can be chosen by demographic requirements such as location and general age/sex of the worker pool. When a contributor completes the work required, the job distribution platform can inform the partner (or channel) that a transaction has completed for a specified amount. The partner can then award the contributor some percentage of the amount in either virtual or real currency. The access to multiple worker pools allows the job distribution platform access to a larger group of workers/contributors and enhances scalability and diversifies worker base. The worker pool which is used for a given job or task can be selected manually by the person posting the task and/or determined in part or in whole by the host server 100. Some pools have limitations, for example, some do not allow adult content, others do not provide the cultural or language needs of the task.

Quality control and the amount of quality desired can be configured by the requesting entity or user such that for example, a user or entity is only charged for the task if completed to the desired or target accuracy level. The channels 110 through which labor can be identified can include by way of example, but not limitation, Amazon Mechanical Turk, Give Work, SamaSource, Trial Pay (e.g., a virtual currency provider), third party social networks (e.g., Facebook, Twitter, LinkedIn, MySpace, third-party social network server 112) or gaming platforms (e.g., Gambit, Prodege, etc.) New and additional labor forces are constantly being integrated into the system and partnering with the host 100, each with their own advantages and disadvantages.

The host server 100, can in addition, also utilize social networks or social network servers (e.g., the 3rd party social network server 112) to aggregate, parse, and/or identify information such as preferences, likes/dislikes, language proficiency, general proficiency, interests, hobbies, expertise related information about workers or contributors which can be used in a worker profile and used as factors in selecting suitable workers for a given job or task.

In some instances, the host server 100 utilizes an online gaming service or platform (e.g., through a third-party gaming server 110 or other partnering platform) through which to distribute tasks or unit jobs and tasks. Gaming services which provide games to various types of online or web-based platforms can also be partnered with the host server 100 of the job distribution platform. Note that the host server 100 may also host gaming services via one or more gaming platforms. The unit jobs can be distributed to garners or other visitors on the gaming platform. In one embodiment, the workers utilized in an online game can be paid in virtual currency, such as virtual currency that can be used to play games on the gaming server 110.

In some instances, the host server 100 utilizes a payment processing server 114 to facilitate payment of workers or contributors 122 in money. The payment processing server 114 can be integrated or operated by the same entity as the host server 100 of the job distribution platform, or it may be operated by a third party. The host server 100 manages the payment preferences of a given worker and ensure, for example, through the payment processing server 114 that the worker gets paid in the desired currency (e.g., U.S. dollars, Euro, etc.), at the desired frequency, in a desired channel (e.g., online, PayPal, direct bank account deposit, physical check, money order), in a desired format (e.g., money, mobile credits, gaming credits, or other types of virtual currency, etc.). For example, the host server 100 can also interact with a mobile credit payment service or mobile credit payment server 116 to facilitate the payment of workers or contributors with mobile credits. The mobile credit payment server 116 may be operated by a wireless network operator or another third party entity. In some instances, the host server 100 internally has mobile credit payment services which operates in whole or in part the payment/compensation of workers in mobile credits.

Figure 2A:
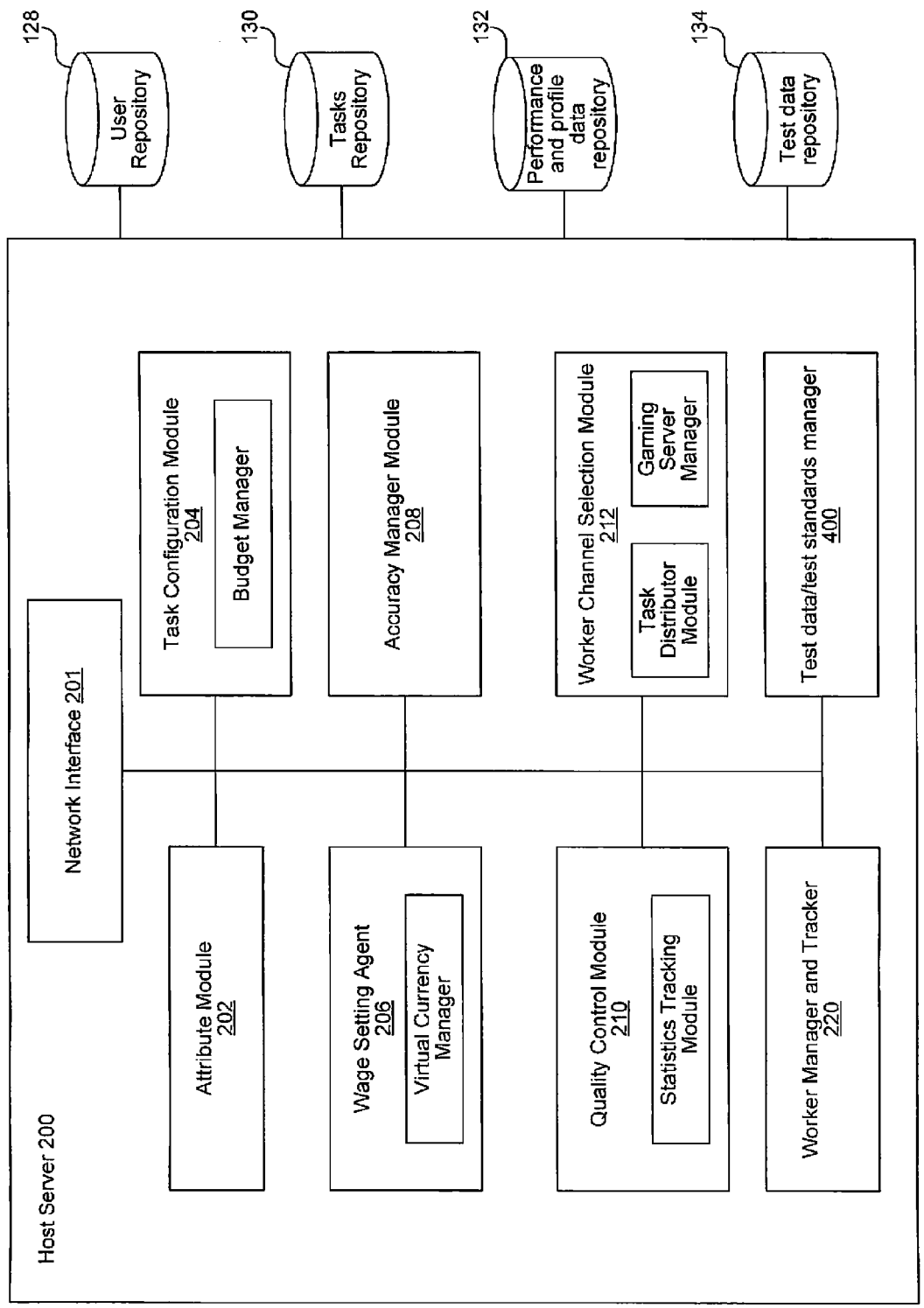
FIG. 2A depicts an example block diagram of the components of a host server of a job distribution platform that distributes (e.g., crowd sources) tasks or microtasks to workers online and providing enhanced quality control through use and aggregation of worker profile data and intelligent dissemination/generation of test/evaluation tasks to evaluator worker quality and reliability.
Figure 2B:
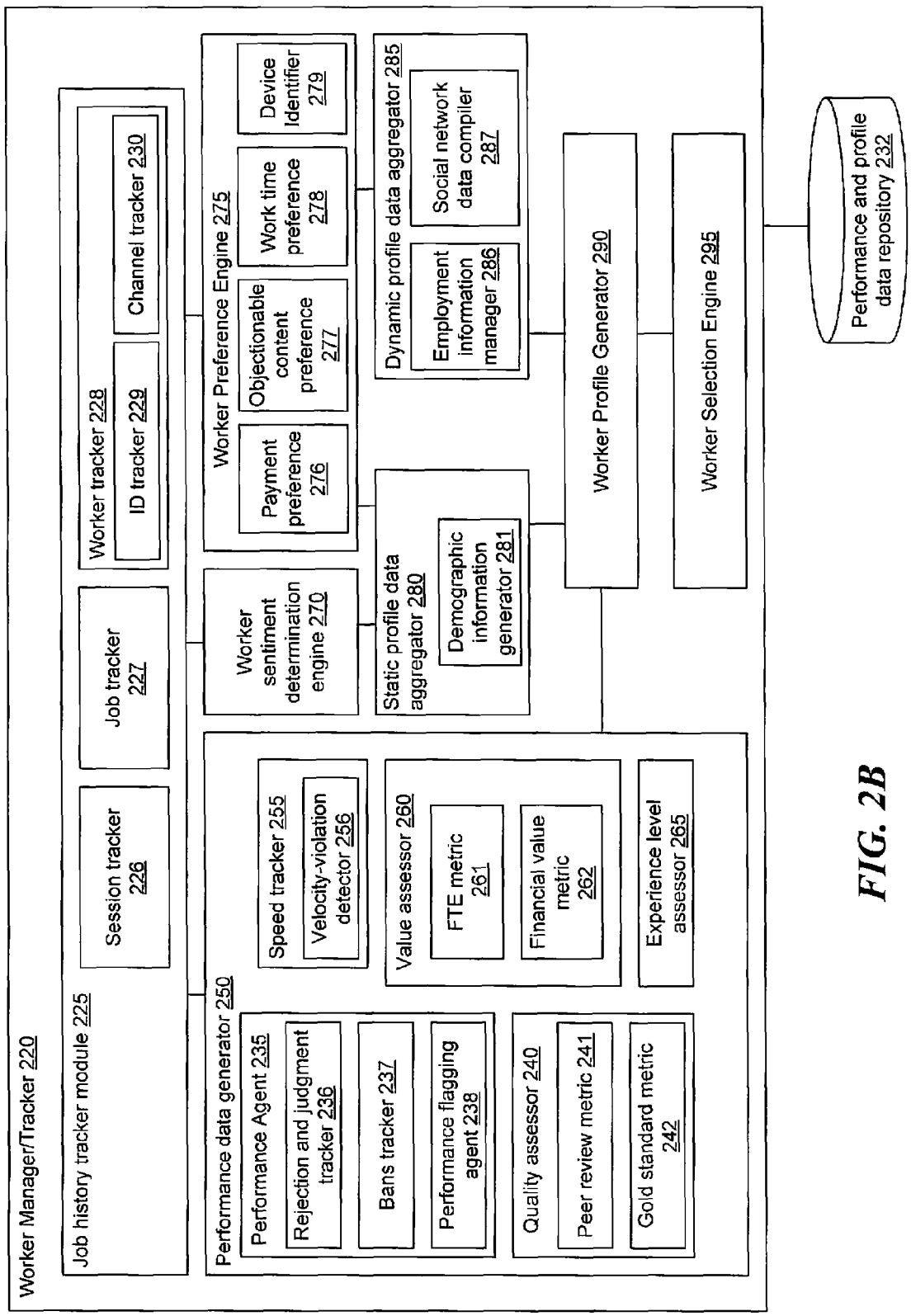
FIG. 2B depicts an example block diagram of the components of a worker manager/tracker module of the host server able to generate and store performance data when a worker performs tasks distributed to them by a job distribution platform which crowd sources tasks over a network to remote workers.
Figure 4:
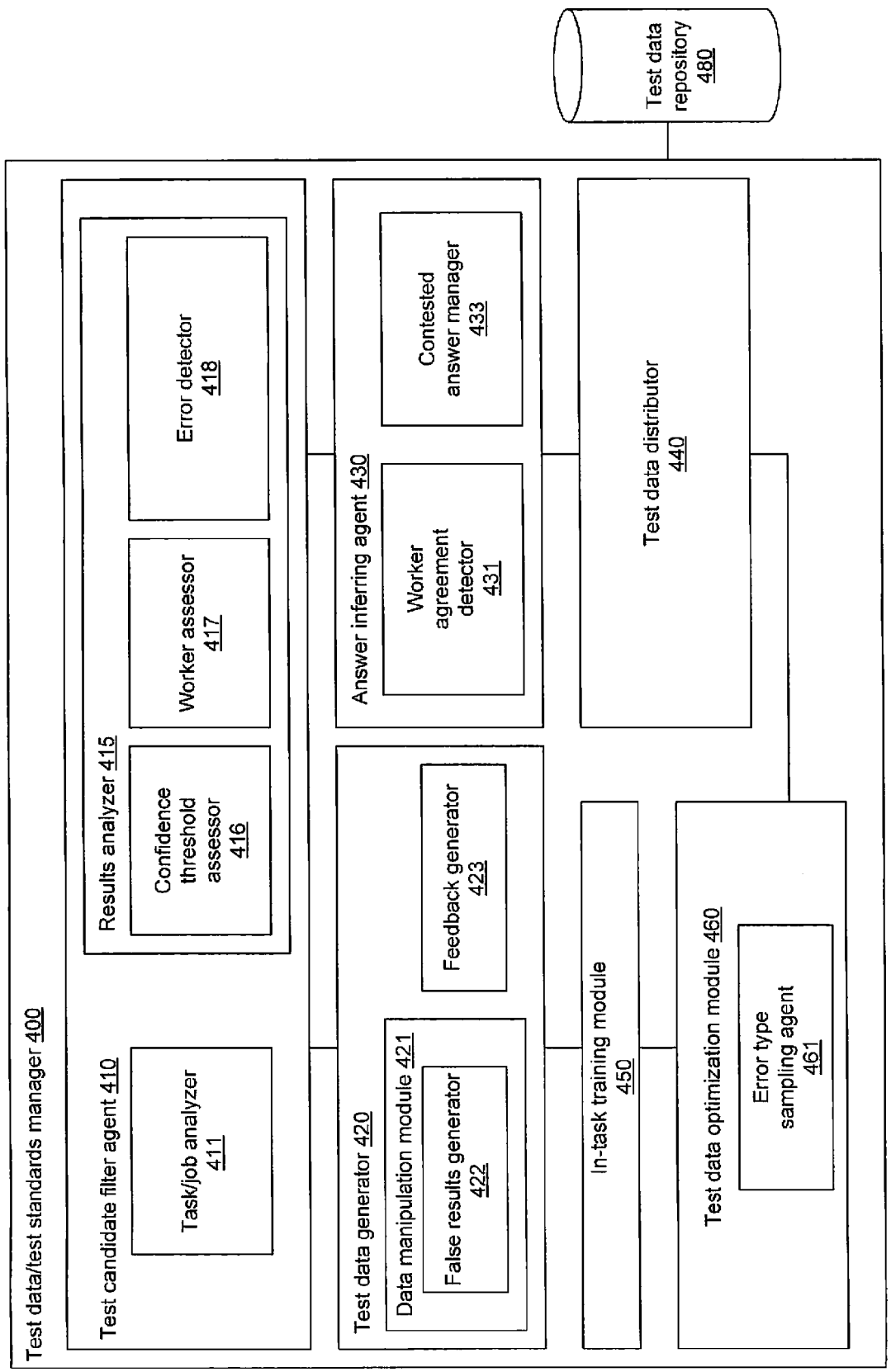
FIG. 4 depicts an example block diagram of the components of a test data/test standards manager for use in evaluating worker performing and for use in providing in-task training.

Functions and techniques performed by the host server 100 and the components therein are described in detail with further references to the examples of FIG. 2A-B and FIG. 4.

The client devices 102A-N are generally operated by entities/users requesting crowd sourcing services, for example via user interface 104A-N displayed on the display units. The client devices may also be. The client devices 102A-N may also be used (e.g., by programmers and developers) by workers to access job units or tasks for completion.

In one embodiment, client devices 102 communicate with the host server 100 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 100 may include internally or be externally coupled to a user repository 128, a job/tasks repository 130, a performance and profile data repository 132, and/or a test data repository 134. The repositories can store software, descriptive data, images, system information, drivers, and/or any other data item utilized by other components of the host server 100 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 100 is able to provide data to be stored in the user repository 128, the tasks repository 130, performance/profile data repository 132, and/or test data repository 134 and/or can retrieve data stored in the repositories. The user repository 128 can store user (e.g., worker) information, statistics, speed, accuracy, topics of interest, topics of expertise, etc. The tasks repository 130 can include, tasks or unit jobs (e.g., in spreadsheets or other types of files) specified by entities or individuals requesting crowd sourcing services. The repository 130 can also include information about the requesting entities or individuals.

One embodiment further includes a performance and profile data repository 132 which can store enhanced worker (e.g., contributor) performance information and metrics, worker preference information, demographic profile information, social network information, peer review information, etc. Additional details of examples of types of data stored in the repository 132 as illustrated with further reference to the example of FIG. 3. One embodiment includes a test data repository 134, which can store generated test data or evaluation data used in assessing worker competency.

FIG. 2A depicts an example block diagram of the components of a host server 200 of a job distribution platform that distributes (e.g., crowd sources) tasks or microtasks to workers online and providing enhanced quality control through use and aggregation of worker profile data and intelligent dissemination/generation of test/evaluation tasks to evaluator worker quality and reliability.

The host server 200 can include, for example, a network interface 201, an attribute module 202, a task configuration module 204 having a budget manager, a wage setting agent 206 having a virtual currency manager, an accuracy manager module 208, a quality control module 210 having a statistics tracking module, a worker channel selection module 212 having a task distributor module and/or a gaming server manager, a worker manager and tracker 220, and/or a test data/test standards manager 400. Additional or less components/modules/engines can be included in the host server 200 and each illustrated component.

The network interface 201 can be a networking module that enables the host server 200 to mediate data in a network with an entity that is external to the host server 200, through any known and/or convenient communications protocol supported by the host and the external entity. The network interface 201 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or its functionality distributed. The module, manager, tracker, agent, handler, or engine can include general or, special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 200 includes an attribute module 202. The attribute module 202 can be any combination of software agents and/or hardware modules (e.g., including processors and/or memory units) able to identify, detect, extract, an attribute of a task, which generally includes multiple units.

An attribute of a task can include, by way of example but not limitation, level of difficulty of the task, level of subjectivity, etc. Task attributes can be specified or measured by an amount of time that is needed to complete the task. In addition, the attribute can include determining target accuracy specified by the entity or user requesting the crowd sourcing services.

Task attributes can be determined during a calibration process when the requesting entity is setting up jobs or tasks to be distributed to on-demand labor for completion. Timing, wages, and target accuracy can be determined and computed for a unit job or task.

One embodiment of the host server 200 includes a task configuration module 204. The task configuration module 204 can be any combination of software agents and/or hardware modules (e.g., including processors and/or memory units) able to configure a task or unit jobs for quality control and based on a user's specified parameters.

For example, the task configuration module 204 allows the user to upload or edit tasks/unit jobs via a web interface. In addition, the task configuration module 204 calibrates a task by identifying its attributes or attributes of a single unit job. For example, the task configuration module 204 determines the amount of time needed a certain unit job or task requires. This information can be used to determine the wage to pay a worker when they have completed their jobs, for example, by the wage setting agent 206.

One embodiment of the host server 200 includes a wage setting agent 206. The wage setting agent 206 can be any combination of software agents and/or hardware modules (e.g., including processors and/or memory units) able to set a wage amount that is offered to a worker for completing a unit job of the task based on the attribute and the target accuracy.

In general, the wage setting agent 206 can set the wage based on one or more of the attributes, level of target accuracy, the requestor's budget, etc. In addition, the requesting entity/user can specify a desired level of wage to pay each worker. In one embodiment, the system sets the wage dynamically. For example, the initial calibration of the wage can be an estimate and the actual wage is calculated as the job progresses. The system can continue to track the amount of time/resources needed by workers to complete a job. This way, the system can compensate for jobs that are taking workers different amounts of time from what was originally estimated. For example, while most jobs end up around $x/hr, but jobs that are extremely time sensitive can be much higher (e.g., as much as 4-20x/hr). There is also a direct correlation between quality of the work and payment amount. Using the wage amount, the agent 206 can also determine the total cost to the requesting entity to complete the task using the total number of job units in the task. The wage setting agent 206 is configured such that the requestor (entity or user) can tweak the total cost by adjusting, one or more of, the target level of accuracy and the desired/ideal level of wage for paying the workers.

One embodiment of the host server 200 includes an accuracy manager module 208. The accuracy manager module 208 can be any combination of software agents and/or hardware modules (e.g., including processors and/or memory units) able to determine, set, identify, the target accuracy in completion of the task by the entity.

The target accuracy can be, for example, specified by the entity/user requesting that a task be distributed to multiple workers (e.g., including online labor, on-demand labor) for completion. The target accuracy can be specified during calibration. The user/entity and indicate whether more or less accuracy is desired. Generally more accurate results require additional results to be obtained per job unit, thus potentially increasing the total cost to complete the task. In some instances, the target accuracy may be set by default rather than user customized.

One embodiment of the host server 200 includes a quality control module 210. The quality control module 210 can be any combination of software agents and/or hardware modules (e.g., including processors and/or memory units) able to implement quality control mechanisms to ensure that the results of the completion of the task are of a quality expected by the requestor.

The quality control module 210 can compute the number of results (e.g., judgments) needed per job unit based on the target accuracy. To compute the number of results, in one embodiment, a minimum number of judgments is initially set. If the measure of agreement is below a predefined percentage once the minimum number of judgments has been collected, more judgments can be collected until the predefined agreement has been met. A maximum number of judgments can also be set, for example to ensure jobs run within budget.

In addition, the quality control module 210 can manage the standards for each task used for quality control. For example, the quality control module 210 enables the requesting entity/user to specify a select set of unit jobs that are presented to online labor units for the entity to evaluate quality of task completion. The questions can be added. In general, the types of tasks that are good for the quality control are those with a right or wrong answer.

For these questions, the correct answers or responses are typically specified. The user/entity can also monitor/track the efficacy of the selected questions. A user can see each selected question and whether workers have correctly answered these questions. The user can also see, access, and/or track how many workers have responded to a selected question. Using the statistics, the user can modify the selection accordingly.

Using these questions, the quality control module 210 can determine the quality of the work and the quality of a particular worker's work product. For example, the quality control module 210 may include a statistics tracking module which tracks, collects and/or aggregates statistics of the online labor units completing the select jobs. In most instances, workers are able to choose any job that has been assigned as long as they meet certain requirements (e.g., age and/or language, etc.). However, workers can also be prohibited from working on a single job, single type of job, or all jobs. For example, workers history, statistics, and performance, can be used to target jobs to workers based on what they have performed well on. Workers are typically allowed to attempt any job they have not been blocked from. If it is the first time they have seen the task they will only be asked known questions. If they have not answered a pre-defined number of questions correctly within a certain time period they are typically not allowed to perform the actual task.

One embodiment of the host server 200 includes a worker selection module 212. The worker selection module 212 can be any combination of software agents and/or hardware modules (e.g., including processors and/or memory units) able to select workers (e.g., online workers, on-demand labor, etc.) to whom to distribute unit jobs of a task.

The worker selection module 212 can select a channel based on the user/entity's selection (e.g., Mechanical Turk, Crowdflower, Gambit (e.g., a third party gaming platform), Give Work, SamaSource, Trial Pay (e.g., a virtual currency provider), Internal, etc. New and additional labor forces are constantly being integrated into the system, each with their own advantages and disadvantages. Based on the selected channel, the task distributor can then distribute jobs to various workers for completion of unit jobs in the task.

In one embodiment, the selected channel is an online gaming environment in which garners or other users are presented with unit jobs while playing games or doing something else. These users can be paid in virtual currency, for example, that they can use in the online gaming environment. Such a process can be performed by the gaming service manager. The gaming server manager can manage games internal to the host server 200 or manage communications with an external gaming server (e.g., the gaming server 110 shown in the example of FIG. 1). The tasks can be presented on a site hosted by the server 200 of presented to workers on the third party site.

In one embodiment, the gaming server manager in the worker channel selection module 212 communicates with the wage setting agent 206 to determine the wage that a worker/gamer would be entitled to upon completion of a unit job or task. The gaming server manager can then determine the amount of virtual currency to which the wage converts. The gaming server manager then communicates the tasks to be presented via the gaming site to the third party gaming server.

One embodiment of the host server 200 includes a worker manager and tracker module 220. The worker channel selection module 212 can be any combination of software agents and/or hardware modules (e.g., including processors and/or memory units) able to detect, track, compute, generate, determine, and/or identify job performance data or job performance-related data for multiple workers/contributors via the job distribution platform. Other types of worker information may also be tracked and generated for multiple workers in various worker pools (channels), for example, psych questions or other more subjective data collected from a worker or contributor in addition to performance.

Worker information including job performance data, can be tracked over a period of time (e.g., historical performance data) for a worker. For example, performance data can be tracked for a given task, a given job (a job can include multiple tasks), a session (e.g., a worker can work on multiple jobs and tasks during a given work session), a day, a week, a month, a year, etc. Useful statistical data can be generated or computed by the manager and tracker module 220 for the job distribution platform to more effectively and efficiently control quality of work product, extract/determine meaningful information about each individual worker/contributor, and/or allow jobs/projects to be more effectively cost managed. By tracking, aggregating, and storing performance data for multiple users across several worker pools, the job distribution platform can have access to useful information for distributing work and managing quality and cost.

Detailed features and functionalities of the worker manager and tracker module 220 are described with reference to FIG. 2B.

One embodiment of the host server 200 includes a test data/test standards manager 400. The test data/test standards manager 400 can be any combination of software agents and/or hardware modules (e.g., including processors and/or memory units) able to generate test data, test jobs, test or evaluation tasks to assess and evaluate worker competency, ability, and/or usability. Manager 400 can also use these test data/jobs or tasks to provide in-task training of workers as they are working on jobs distributed by the host 200. Detailed features and functionalities of the test data/test standards manager 400 are described with reference to FIG. 4.

The host server 200 represents any one or a portion of the functions described for the modules. The host server 200 can include additional or less modules. More or less functions can be included, in whole or in part, without deviating from the novel art of the disclosure. The repositories 128, 130, and 132 were discussed in conjunction with the description of FIG. 1. The repository 132 is described with further reference to the example of FIG. 3.

FIG. 2B depicts an example block diagram of the components of a worker manager/tracker module 220 of the host server 200 of the example of FIG. 2A able to generate and store performance data for a worker.

The performance data can be determined or generated when a worker performs tasks distributed to them by a job distribution platform (e.g., hosted by the host server 200) which crowd sources tasks over a network to remote workers.

The module 220 can include, for example, a job history tracker module 225 having a session tracker 226, a job tracker 227, a worker tracker 228 having an ID tracker 229 and/or a channel tracker 230. The module 220 can further include a performance data generator 250 having a performance agent 235, a device identifier 245, a quality assessor 240, a speed tracker 255, a value assessor 260, and/or an experience level assessor 265. The performance agent 235 can further include a rejection/judgment tracker 236, a bans tracker 237, and/or a performance flagging agent 238. The quality assessor 240 can include a peer review metric module 241 and/or a gold standard metric module 242. The speed tracker 255 may further include a velocity violation detector 256. The value assessor 260 can include an FTE metric module 261 and/or a financial value metric module 262.

The worker manager/tracker module 220 can further include a worker sentiment determination engine 270, a worker preference engine 275, a static profile data aggregator 280 having a demographic information generator 281, a dynamic profile data aggregator 285, a worker profile generator 290, and/or a worker selection engine 295. The worker preference engine 275 can further include a payment preference handler 276, an objectionable content preference handler 277, and/or a work time preference handler 278. The dynamic profile data aggregator 285 can include an employment information manager 286 and/or a social network data compiler 287.

Additional or less components can be included in the host server 200 and each illustrated component.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or its functionality distributed. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the worker manager/tracker 220 includes a job history tracker module 225. The job history tracker module 225 can be any combination of software agents and/or hardware modules (e.g., including processors and/or memory units) able to monitor, track, determine, record, tasks, microtasks, jobs, projects that workers or contributors have worked on through the job distribution platform hosted by server 200. Job attributes, owners, details and the knowledge/expertise involved in each job/task/project can be determined, tracked, recorded for each worker or contributor performing the job and stored (e.g., in repository 132) in association with any quality or performance data for the worker.

The job history tracker module can track and store the jobs performed by workers in a given session (e.g., by the session tracker 226). For example, a worker can perform several jobs in a given work session (e.g., from the time a worker logs in to access work distributed by the job distribution platform to when the user logs out or times out, or stops working for a certain amount of time). A work session can also have a default time period duration (e.g., one day, a certain number of hours, user gets logged out of the system, a few days, etc.) as specified by the worker, job distribution platform, or a given job.

In a given work session, a worker/contributor can work on several projects or jobs, with each project or job having several tasks. The session tracker 226 can track the projects, jobs, and/or tasks that the worker has worked on in a given session and generate or compute statistics (e.g., job performance metrics) for a given project, job, or task in a given session or across multiple sessions. The statuses of the various projects, jobs, and/or tasks performed in a session can also be determined and stored. For example, the session tracker 226 can track one or more tasks that span current jobs and a history of previous jobs distributed to the worker and job performance data for the worker is collected for current and previous jobs.

Similarly, the job history tracker module can track the tasks performed by workers in a given job or across multiple jobs (e.g., by the job tracker module 227). The job tracker 227 can identify, record, and store tasks assigned to and/or performed on, worked on by the workers/contributors. The job tracker module 227 can track a history of previous jobs having tasks a worker has worked on. The statuses of various jobs and/or tasks worked on by workers/contributors can be determined and/or recorded. The worker tracker 228 can track workers that have worked in the sessions, jobs, projects, and on tasks.

In one embodiment, the worker tracker 228 assigns a unique identifier (e.g., using the ID tracker 229) to each unique worker/contributor who has worked on tasks assigned via the job distribution platform. The unique identifier can be used to identify worker profile information and/or worker performance data. The unique identifier can be assigned to the worker to be associated with the worker across various jobs and tasks. The worker manager/tracker 220 can also track a worker based on the worker pool or channel though which the worker is connected to the job distribution platform, for example, by the channel tracker 230. In some instances, a given worker may be a part of multiple worker pools and the unique worker ID can be assigned to a given worker regardless of their multiple worker pool affiliations.

The performance data generator 250 of the worker manager/tracker module 220 can be any combination of software agents and/or hardware modules (e.g., including processors and/or memory units) able to monitor, track, determine, record, job performance data over a period of time for workers/contributors performing work through the job distribution platform that crowd sources tasks to multiple workers.

In general, the job performance data can be collected when the worker performs the tasks distributed online to their respective computing devices by the job distribution platform. In one embodiment, the job performance data includes quantitative metrics which can be determined or computed by the performance agent 235 for various performance and/or quality measures. For example, the rejection and judgment tracker 236 can detect and record results submitted by a worker/contributor that were rejected as faulty or accepted as a correct result (e.g., a judgment). Managing the distribution of tasks can be performed by a task requisition system, for example, using a custom implementation of the in-memory repository or database (e.g., Redis). The repository can be optimized for ensuring redundancy and performing the corresponding de-duplication. For instance, de-duplication can be implemented such that no contributor or worker sees the same task more than a specified number (e.g., once, twice, three times, etc.). If a contributor or worker is rejected, the tasks they had previously completed can be re-routed to other contributors or workers.

In one embodiment, the job performance data includes quantitative metrics which indicate a rate or number of rejected results in performing one or more tasks or jobs, as can be determined by the rejection/judgment tracker 236. Some of the rejections and/or judgments are received as a result of test tasks distributed to workers/contributors in order to make an assessment regarding their quality of work.

In one embodiment, the job performance data includes quantitative metrics indicating a rate or number of instances of bans from the system of flags from assigned jobs, for example, by the bans or flag tracker 237. In general, a 'flagged' worker prevents the workers or contributors from continuing to work on a specific task, or set of tasks. If a worker is banned, it is generally a one time event, and prevents a worker from doing future work through the platform.

A worker/contributor may be banned from performing work through the platform or flagged from performing specific jobs or tasks when the quality or speed of the work does not meet a threshold, which can be set by the job or the job distribution platform. For example, a worker/contributor may be temporarily or permanently suspended from a job if a number of results they provided are inaccurate, or if they submit a certain number of inaccurate results in a certain amount of time, or if the worker does not complete a task within a specified time frame (e.g., by the job poster or the job distribution platform).

In one embodiment, the job performance data includes quantitative metrics indicating a rate or number of instances of the worker has been flagged for performance review but not actually banned from a job or task, for example, by the performance flagging agent 238. Flagging can occur manually or programmatically after certain thresholds have been met. For example, flagging occurs after a peer review system has indicated a contributor is not performing accordingly or showing indicators of poor performance (e.g., spelling mistakes, irrelevant answers, or any other subjective requirements detectable by reviewers). A worker/contributor may be flagged when their performance (e.g., as indicated by one or more performance metrics of quality or speed) falls below a certain threshold, which may be set by a job requestor and/or in part or in whole determined by the job distribution platform. The rate or number of instances when the worker has been flagged for performance review can be used in assessing overall quality/performance of the worker.

In one embodiment, the performance data generator 250 tracks a rate or time with which the worker completes the one or more tasks, for example, via the speed tracker 255. The speed tracker 255 can also determine the speed, rate with which, or amount of time it takes a worker to complete a job, on average over a period of time, over a set of tasks, or over a set of jobs, for example. The rate or time with which the worker completes a task can be used as an indication in a worker profile of how efficient the worker is.

The speed tracker 255 can also track instances when the worker performs or completes a task exceeding a rate or speed, which may be an indication that a worker is not paying attention to performing the assigned tasks. As such, the job performance data can include quantitative metrics indicating a rate or number when the worker has performed or completed one or more tasks exceeding a rate or speed. In addition, the job performance data can include quantitative metrics indicating an average rate or speed with which the worker can satisfactorily complete a task, which can be used as an indicator for efficiency and/or accuracy of the worker. Each or any of the above metrics of job performance can be tracked for workers for a given job, a work session, or a number of tasks.

In one embodiment, the value assessor 260 determines the value, either quantitative or qualitative value, of work generated by workers/contributors. For example, the financial/monetary value of work generated by workers can be determined by module 262 and included as a quantitative metric of job performance data stored for a given worker/contributor. In one embodiment, the quality assessor 240 can determine the accuracy of work generated by the worker using test jobs (e.g., jobs or tasks with known responses/answers). Using test jobs/tasks with known responses/answers, the quality/accuracy of a worker's work product can directly be determined and used in computing a quantitative metric indicating the accuracy of a worker's work product. Quality assessment using test jobs/tasks can be performed by the gold standard metric module 242. In addition, the quality assessment can be performed by the peer review metric module 241, where a worker's work product can be evaluated using results generated by other workers (e.g., determine whether they match or not).

One embodiment of the performance data generator 250 includes an experience level assessor 265 which can determine an experience level of the worker based on duration or tenure with the job distribution platform. The job performance data for workers can thus include quantitative and/or qualitative metrics indicating the experience level of the worker. In addition, experience level can be determined with respect to specific types of jobs/tasks (e.g., business listing verification, content generation, adult-content detection, search result verification, etc.), or with respect to specific disciplines (e.g., art, computer science, math, language, etc.) and indicated in the job performance data of the user profile.

In one embodiment, satisfaction and/or frustration level with the job distribution platform is determined, for example, by the worker sentiment determination engine 270 to be included in the profile data. For instance, quantitative metrics indicating the satisfaction or frustration levels can be included in a worker's profile data.

In one embodiment, the profile data further includes, identification of devices used by the worker to perform tasks distributed by the job distribution platform or a preference of the worker to use one or more devices to work on tasks or specific types of tasks. The devices can be identified by the worker preference engine 275, or the device identifier 245. In general, the worker preference engine 275 can determine, identify, track, record, or store the preferences of the workers. Worker preferences can be explicitly specified by the worker, determined from the worker pool or specific channel through which the worker is accessed, and/or inferred from worker behavior by the job distribution platform. Worker preferences can include an indication of a preferred time of day to perform tasks (e.g., by the work time preference handler 278), indication of willingness to perform tasks involving objectionable content or adult content (e.g., by the objectionable content preference handler 277).

Worker preferences can further include compensation preferences, which can specify preferred wage, preferred currency, and preferred type of currency and/or specify preferred payment mechanism including one or more of, direct deposit, indirect deposit, or mobile credits. Compensation preferences may be determined, tracked, and/or managed by the payment preferences handler 276.

The user profile for workers can also include static profile data created or aggregated by the static profile aggregator 280. For example, demographic profile information (e.g., including, but not limited to, gender, age, ethnicity, religion, education, location, etc.) of workers can be determined, tracked, received, processed, recorded and managed by the demographic information generator 281.

The user profile can also include dynamic profile data which can be collected, aggregated, determined, detected, inferred, tracked, processed, received, stored and/or recorded by the dynamic profile data aggregator 285. For example, employment status information for workers can be determined and tracked by the employment information manager 286. Social profile data and/or professional profile data can also be aggregated for workers, for example from social network services including third party social networks and servers. Dynamical profile elements generated from historical work data can also be used. For example, the aggregator 285 can determine or track workers' historical speed, accuracy, or answer distribution and make this information queryable through the contributor profile. The aggregator 285 can also apply learning algorithms to good signals to predict future performance of a worker.

The worker profile generator 290 can use any combination of or all of the above user data including, but not limited to, quantitative and/or qualitative performance metrics for worker performance quality indicating accuracy, efficiency, knowledge, financial value, and/or expertise, worker preference (explicit or non-explicit), static or dynamic profile data (e.g., demographic information, real-life employment information, social network, presence, location information) to generate a worker profile for the worker.

The worker profile or any of the information contained therein can be used by the worker selection engine 295 in selecting a suitable worker from the repeat workers for a given task. For example, a given worker or workers can be selected to perform the new job based on worker preferences indicating willingness or unwillingness to work on objectionable or controversial content, or other criteria related to experience level, efficiency, or overall quality/accuracy.

Figure 3:
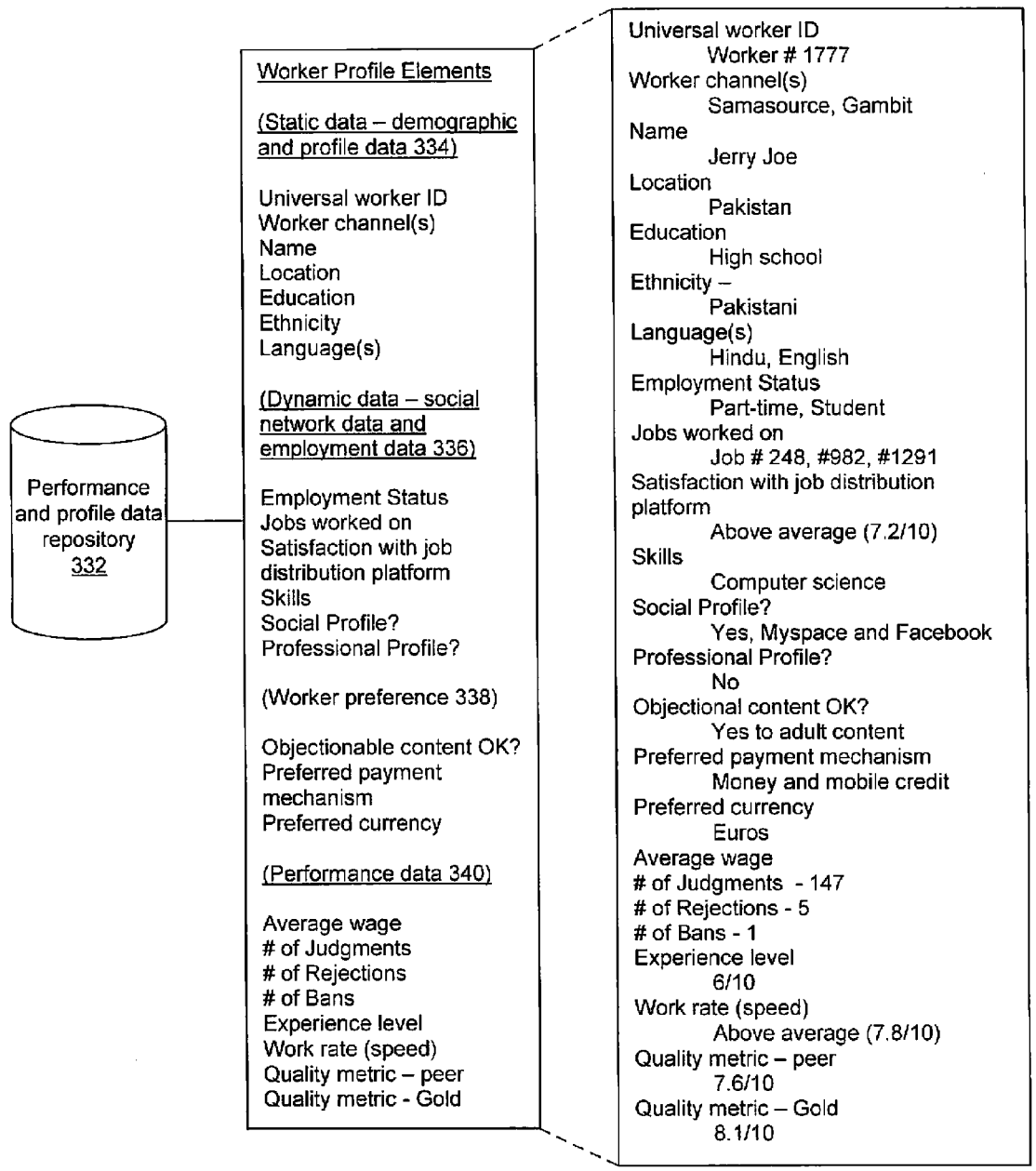
FIG. 3 illustrates an example repository for storing worker/contributor performance and profile data.

FIG. 3 illustrates an example repository 332 for storing worker/contributor performance and profile data.

The performance and profile data can include information aggregated or determined by the worker manager/tracker 220 shown in the example of FIG. 2 and the various components therein. As described in FIG. 2, the worker profile elements can include static data 334, dynamic data 336, worker preference information 338, and/or performance data 340. An example listing of each category of worker profile data is shown. Metrics for performance data can be quantitative (as shown in the example of FIG. 3) or qualitative (e.g., good, bad, average, or assigned a letter grade (P/NP, A, C, D, etc.). Other types of metrics of measure can also be used.

FIG. 4 depicts an example block diagram of the components of a test data/test standards manager 400 for use in evaluating worker performing and for use in providing in-task training.

The test data/test standards manager 400 can include, a test candidate filter agent 410, a test data generator 420 having a data manipulation module 421 and/or a feedback generator 423, an answer inferring agent 430 having a worker agreement detector 431 and/or a contested answer manager 433, a test data distributor 440, an in-task training module 450, and/or a test data optimization module 460 having an error type sampling agent 461. The data manipulation module 421 may include a false results generator 422. In one embodiment, the test candidate filter agent 410 can further include a task/job analyzer 411 and/or a results analyzer 415 having a confidence threshold assessor 416, a worker assessor 417, and/or an error detector 418.

Additional or less components can be included in the test data/test standards manager 400 and each illustrated component.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or its functionality distributed. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The test candidate filter agent 410 can be any combination of software agents and/or hardware modules (e.g., including processors and/or memory units) able to select, identify, qualify, from jobs for distribution to workers to work on to from which generate a test or evaluation task.

In general, test or evaluation tasks are generated from actual jobs with known responses or known answers such that they can be automatically generated with no human intervention or semi-automatically generated with minimal manual editing/intervention such that the process can be efficiently scaled and deployed. Therefore, in one embodiment, the task/job analyzer 411 is able to analyze submitted jobs or tasks based on various parameters to determine suitability for use a test/evaluation task.

The parameters which can be used to determine suitability include, whether a correct response is known for a given/task job, the certainty (degree) with which a response is known to be accurate, whether a given/task job has known common worker errors, whether a response to a given task/job is subjective or objective, number of correct responses/results for a given task/job, for example. The task/job analyzer 411 can assess an actual job or task based the above parameters or additional parameters to identify those suitable for use in testing or evaluating worker competency.

In general, jobs with known responses, or responses known to be accurate to a certain threshold, can be considered as suitable for direct use or modified for use as test/evaluation tasks. For example, the results analyzer 415 can review, analyze, jobs/tasks and associated actual responses received from workers/contributors to determine whether correct data/responses are known. The results analyzer 415 can also determine whether a given task/job is associated with a single objective answer which is correct or whether the task/job may have several answers which can be correct. In general, the results analyzer 415 selects task/jobs that have a single objective answer, or a few objective answers for use as candidates or ideal candidates for creation of test jobs/evaluation tasks.

In one embodiment, the results analyzer 415 can determine the confidence with which a given response to a job/task is known to be correct. If the confidence is determined to exceed a threshold (e.g., by a confidence threshold assessor 416), the job/task and the response can be used in generation of a test or evaluation task for the benchmarking of other or new workers, for example. The confidence threshold assessor 416 can determine or estimate the confidence level based on, for example the number of same results received from workers for a given job/task. For example, through the answer inferring agent 430 coupled to the results analyzer 415. The answer inferring agent 430 can detect agreement among various workers in the responses they provided for the same task/job (e.g., via the worker agreement detector 431). Typically, a larger number of same responses provided by different workers for the same task/job correspond to a higher confidence level associated with that response which can be tracked by the confidence threshold assessor 416.

In some instances, confidence level of a response depends in part or in whole on the worker who submitted the response, and whether the worker is generally known to provide high quality work product and/or has demonstrated expertise or capabilities in certain areas, as determined by the worker assessor 417. For example, responses provided by workers of higher confidence (e.g., known to be highly competent or reliable, or known experts) can be weighed higher in determining confidence level of a response. Occasionally, multiple or a large number of workers will agree on the same-wrong result which the system may then inaccurately categorize as the correct response for a given task/job. The contested answer manager 433 provides a feedback mechanism to address this by allowing workers to contest the wrong result when working on the test task, for example, via the contested answer manager 433. In one embodiment, a given test task is removed or disabled when the contention rate for a given result of a test is exceeds or meets a threshold.

One embodiment of the results analyzer 415 includes an error detector 418 which can detect, identify, filter, determine, spot errors in responses provided by workers in performing the distributed tasks/jobs. The error detector 418 can also identify one or more common worker errors associated with a given task/job. For example, in a URL verification task, workers might have difficulty with businesses which are similarly named but are located in the wrong city.

For instance, if a local search engine wanted the "Bob's Restaurant" located in Seattle, Wash., but the URL provided was for a "Bob's Restaurant" in Portland, Oreg., workers often have difficulty distinguishing between the two and incorrectly state the URL is for the right business in the given city and state. As described below, it is possible to generate test tasks/jobs that directly target this type of worker error (e.g., "city/state" evaluation tasks). Since worker errors can fall into discrete sets, once these are identified, test tasks/evaluation tasks can be generated, for example, by the test data generator 420. Test tasks generated from common worker errors can also be utilized to train workers, for example, via the in-task training module 450.

Using the results of the jobs/tasks analyzed and filtered by the test candidate filter agent 410, the test data generator 420 can then use the candidate jobs, known answers, answers meeting a confidence threshold, known errors, known common errors to generate test tasks. In one embodiment, a given job/task which is associated with a known correct result (e.g., as determined from agreement among results provided from different workers or a certain number of users) can be created into a test data unit or test data pair by the test data generator 420 for use in verification by a worker. In the case that a known correct result is associated with a test job/task, the worker is to verify the accuracy of such a result for satisfactory completion of the test job/task.

In one embodiment, knowing a correct result or result meeting or exceeding a confidence threshold and is thus treated as a correct result associated with a job task, can be used to generate a test unit/data with a manipulated result, which is known to be an incorrect result for the job to generate a test task. The correct result or can be manipulated by the data manipulation module 421 to generate another result which is incorrect (e.g., by the false results generator 422) to be associated with the job/task to generate a test data unit. In one embodiment, the manipulated result is determined from frequently received worker errors in response to working on the job, to target common worker errors and to provide in-task worker training on the common types of errors.

Figure 5:
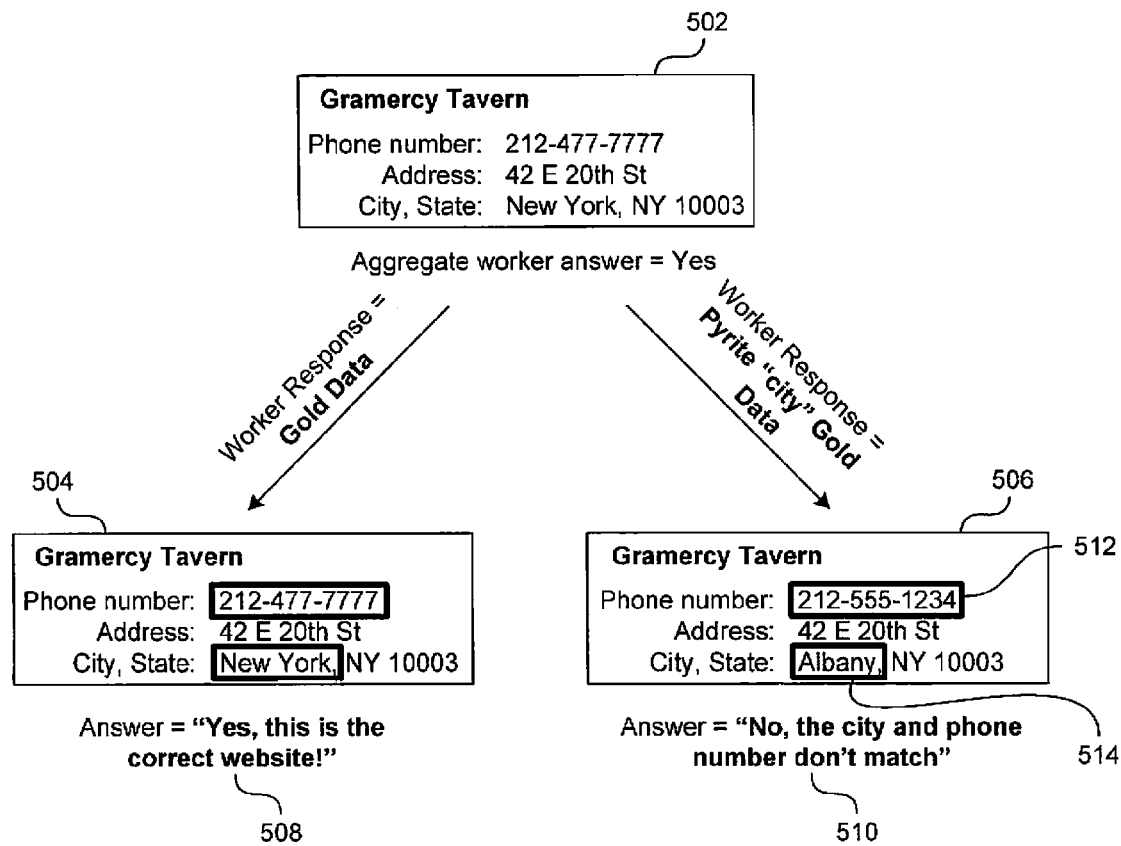
FIG. 5 depicts a diagram showing an example of test tasks generated from a job with a known result.

In this case, to successfully complete this test job, the worker should be able to identify the manipulated result associated with the test job to be incorrect. Specifically, the work quality of the worker is evaluated in part by determining whether the worker has identified the manipulated result as being an inaccurate result for the job. Examples of test tasks/test job units generated from a job with a known result are illustrated in the example of FIG. 5.

Once the test jobs/tasks (e.g., evaluation jobs/tasks) have been generated by the test data generator 420, the test data distributor 440 presents the test tasks to workers for evaluation of worker quality, via their respective computing devices. In general, the test task(s) are presented among other (regular) jobs such that the worker is unaware of which of the jobs is being used to evaluate the work quality. The frequency with which test tasks are presented to workers can be adjusted dynamically based on worker performance, for example. In general, the better a contributor is performing against the test set, the fewer test questions are presented. One embodiment of the test data generator 420 further includes a feedback generator 423 which generates feedback messages from known incorrect results.

The feedback message can be presented to the worker evaluating the test task if the worker fails to identify the manipulated result as being inaccurate for the job and facilitate the in-task training process, for example the in-task training process performed by the in-task training module 450.

The test data optimization module 460 can review and analyze created test units/test jobs and determine/assess their efficacy. For example, test units or jobs with contested responses can be monitored, tracked, and removed, disabled, or edited as appropriate by the optimization module 460. The optimization module 460 performs the associated tasks and analysis needed for ensuring that test units/jobs provide an accurate representation of worker quality, reliability, or competency. One embodiment of the optimization module 460 includes the error type sampling agent 461. The sampling agent 461 is able to sample different types of worker errors for use in creating or optimizing test data sets/test units. Identification and sampling of different worker error types allows test data/test tasks to be generated with a uniform distribution of target errors.

FIG. 5 depicts a diagram showing an example of test tasks 508 and 510 generated from a job with a known result 502.

Each manipulation or mutation of data can be applied to a single job unit U with correct result 502, but generally requires all available data as input. The manipulation can alter individual attributes of the data to produce a new unit that (a) differs the original unit enough to violate task requirements and (b) looks similar to original data. For example, to create test units/tasks to verify city-state of a business variables can be assigned to each of address, city, state, postal code, and phone number ("location information") in a business listing.

The job's location information can be manipulated with another location information from another entity, for example by a randomized mixing function. For instance, in a generated test task 506, Gramercy Tavern in New York, N.Y., 10003 212-477-0777 would now have the location information from an entity outside of New York. Workers would be presented with the information Gramercy Tavern, Albany, N.Y. 10003, 212-555-1234 while the link (http://www.gramercytavern.com) would still take the workers to the Gramercy Tavern in New York City. The workers should answer "no" because the entity is not in the correct location or with the correct phone number.

Another example type of test unit/test data is the identification or verification of names. These test units/test data can target behavior where workers would say that the website for Enterprise Lawyers located in Durango, Colo., was the correct website for Enterprise Group, also located in Durango, Colo. To address this problem, test units can be generated by taking answers where workers had answered yes with 1 confidence, then parsing out the words into their component pieces (i.e. first word, second word) and rearranging both the component pieces of the names, as well as the last 7 digits of the phone number. For instance, for the unit Nulook Party in Greenville, N.C. with phone number 252-367-7444, the name and the phone number can be scrambled in the manipulation process so that the gold unit would be Automated Party in Greenville, N.C. with phone number 252-8985-9733. A worker would need to identify that this is not the correct website to satisfactorily complete the test task/job.

Each manipulation or mutation function produces the test task/unit that corresponds to a particular error identified earlier. In one embodiment, the description of the error can be used to automatically generate a feedback message. For example, if the workers answered city-state test task for business listing verification incorrectly, they may be presented a feedback message stating "The URL is for Gramercy Tavern located in New York, N.Y. We asked for the Gramercy Tavern in Albany, N.Y. Be sure to check that the restaurant is located in the correct city and state!" For example, if workers answered name-based test task/job incorrectly, they may be presented with a message of "The URL is for Nulook Party in Greenvile, N.C., but we asked for Automated Party. Be sure that the name is the same!"

Figure 6:
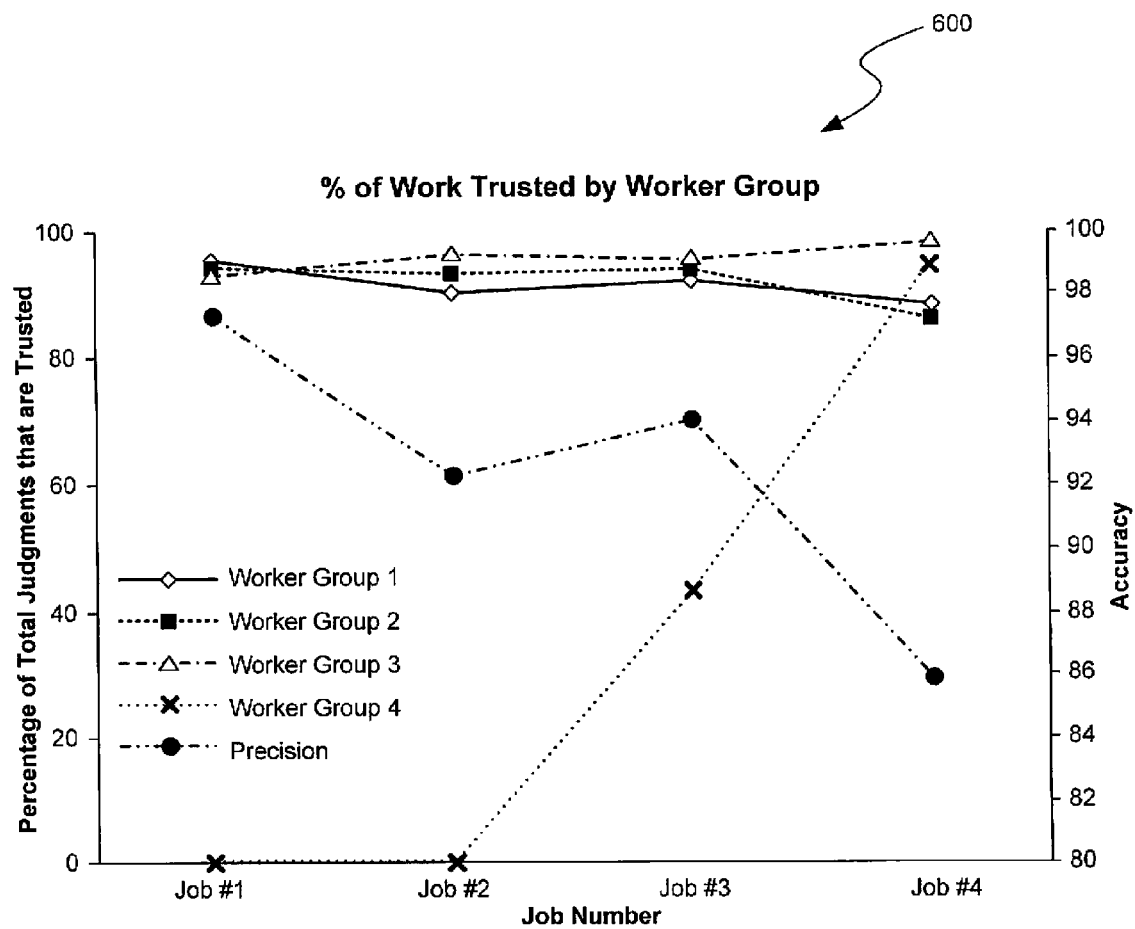
FIG. 6 depicts a graph showing worker accuracy degradation over time when workers have begun to learn the test tasks.

FIG. 6 depicts a graph 600 showing worker accuracy degradation over time when workers have begun to learn the test tasks.

Repeat exposure to specific test tasks/evaluation jobs increases the likelihood that a worker can recognize a particular unit (particularly one which he or she has answered incorrectly previously) as belonging to the quality control mechanism implemented in the job distribution platform/service. This can result in a subsequent minimal effort by a worker on true jobs/tasks. In jobs with a high number of units, if a particular test unit is viewed repeatedly by a single worker, it could invalidate the accuracy estimate. For example, as depicted in chart 600, in job 1, there is new test data/tasks and workers from group 1 cannot pass the accuracy targets and as such none or little of their actual work performed is counted, and accuracy is at 97%. By Job 4, group 1 workers have learned the test tasks thus allowing them to submit inaccurate judgments on non-test tasks/jobs (or actual jobs), and causes the overall accuracy to degrade to only 85%.

However, limiting the maximum of amount of work per worker may minimize repeat views of test job/task units, but can also result in decreased throughput. Use of extra (or excessive) questions (or very large test data sets) to minimize repeat views of specific test tasks involves a considerable cost. In one embodiment, an optimize size of gold data (or test data set) can be determined by computing:

$$X*P/(N-G)$$

Where X is the number of tasks in the job, P is a maximum percentage of the job you want any one worker to complete (usually no greater than 0.33). N is the number of tasks on a single page, and G is the number of gold displayed per page. Therefore a job with 1000 tasks, 10 tasks per page, and 1 gold per page (on average) would look like: 1000*0.33/(10−1)=37.

FIG. 7A depicts a table 700 illustrating worker result accuracy comparing when no test tasks are used, when test tasks are automatically generated from jobs, or with manually defined test tasks.

In table 700, the data obtained for Experiment 1 compares the effect of manually defined tests ("manual gold") with automatically generated tests ("programmatic gold") for a dataset of 9,659 business listings which had web addresses are used. The goal was to first verify the correct name of the business, and, if the business name was different on the website vs. the information in the business listing, change the business name to the name listed on the website. Workers were instructed to find the correct business name on the website and, if the name provided by the local index was incorrect, copy and paste the correct name from the URL onto the page. Some businesses have different names for specific locations or divisions of the business. In that situation, workers were asked to use the name that best matches the location or division.

Existing data runs are used to look for units where workers agreed with each other with confidence. Then, these units were converted into test tasks/units (without any additional transformations), and processed the data again. To measure the effect of programmatic gold, three data runs performed: with no test units, with manually-defined test units and with programmatic test units (automatically generated test units). To measure accuracy, internal audits (spot checks) of 100 units were performed on each set. For each unit, we measure if the aggregate result is correct or not. The accuracy is then the percentage of correct aggregate results in the spot check. Different kinds of errors are not reflected in the accuracy measure—any incorrect result is treated the same.

FIG. 7B depicts a table 750 illustrating worker result accuracy comparing when no test tasks are used, when test tasks are automatically generated from jobs, or with manually defined test tasks.

The table 750 depicts results of experiment #2 which tests the scaling up of the test dataset from 10 initial test tasks/units to a total of 22,000 test tasks/units. In experiment #2, a 22,000-unit subset of a larger set of 500,000 local business listings with business web address (candidate URL), business name, physical address, and phone number data. The goal was to verify whether or not the candidate URL was correct.

Workers are presented with the business data and the URL candidate and are instructed to answer "yes, this is the correct URL" (a "yes unit") if it meets at least one of the following conditions:

1. A location of the business on the website is located in the provided city or has the provided phone number and the business name on the website is similar to the provided name 2. A location of the business on the website is located in the provided city and the business name on the website is nearly identical to the provided name.

To process such a large dataset, a minimum number of test units are need for a certain number of tests/tasks to be performed. For example, then processing this data at the rate of 20,000 task/day and test tasks/units can be refreshed on a daily basis. Some or all of these units would be created manually.

Figure 8:
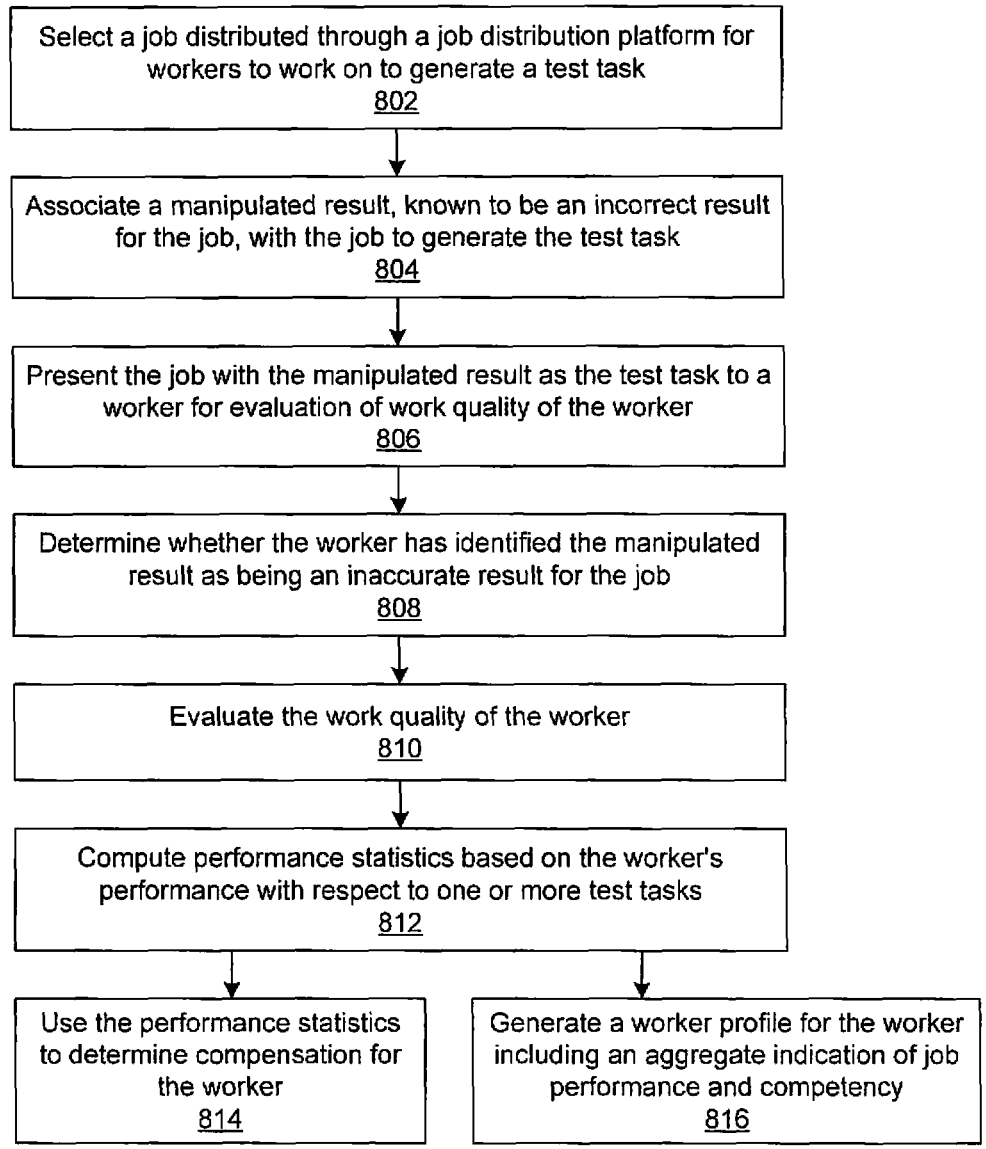
FIG. 8 depicts a flow chart illustrating an example process for test/evaluation task generation from a job distributed through a job distribution platform.

FIG. 8 depicts a flow chart illustrating an example process for test/evaluation task generation from a job distributed through a job distribution platform.

In process 802, a job distributed through a job distribution platform for workers to work on is selected to generate a test task. The job distribution platform crowd sources tasks online to workers to work on via their respective computing devices. In general, jobs distributed through the job distribution platform include, by way of example but not limitation, content generation, content moderation, data enrichment, verification of a business listing, verification of a URL, or verification of a search result generated from a search engine.

Note that the selected job is typically associated with a known correct result, which can be determined from agreement among results provided from different workers. The job used to generate the test task can alternatively be selected from jobs with results known to meet or exceed a threshold level of confidence. The threshold level of confidence can be represented by a number of matching results provided by workers.

In process 804, a manipulated result, known to be an incorrect result for the job, is associated with the job to generate the test task. In one embodiment, the manipulated result is determined from frequently received worker errors or actual worker errors in response to working on the job.

In process 806, the job is presented with the manipulated result as the test task to a worker for evaluation of work quality of the worker. In general, the test task is presented among other jobs such that the worker is unaware of which of the jobs is being used to evaluate the work quality. In process 808, it is determined whether the worker has identified the manipulated result as being an inaccurate result for the job. In process 810, work quality of the worker is evaluated, for example, by determining whether the worker has identified the manipulated result as being an inaccurate result for the job.

In process 812, performance statistics are computed based on the worker's performance with respect to one or more test tasks. In process 814, the performance statistics are used to determine compensation for the worker. The performance statistics can be used to determine compensation or wages, or bonuses for the worker. In process 816, a worker profile for the worker including an aggregate indication of job performance and competency is generated.

Figure 9:
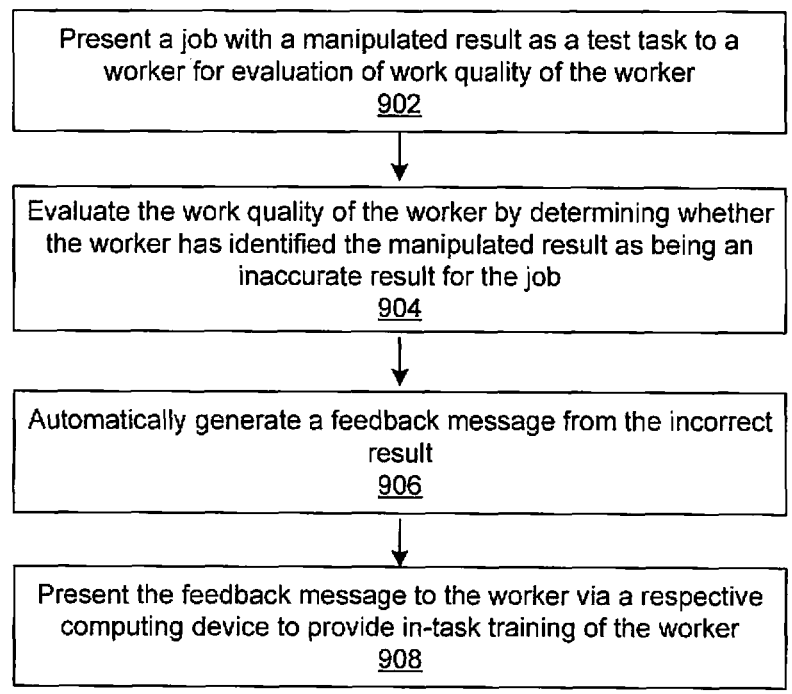
FIG. 9 depicts a flow chart illustrating an example process for providing in-task training of a worker in performing crowd sourced tasks.

FIG. 9 depicts a chart illustrating an example process for providing in-task training of a worker in performing crowd sourced tasks.

In process 902, a job with a manipulated result is presented as a test task to a worker for evaluation of work quality of the worker. The manipulated result used in the test task is typically an inaccurate result and the presentation of the test task can be disguised among actual jobs that are not test tasks.

In process 904, the work quality of the worker is evaluated by determining whether the worker has identified the manipulated result as being an inaccurate result for the job. In process 906, a feedback message is automatically generated from the incorrect result. In process 908, the feedback message is presented to the worker via a respective computing device to provide in-task training of the worker, for example, if the worker fails to identify the manipulated result as being inaccurate for the job.

Figure 10:
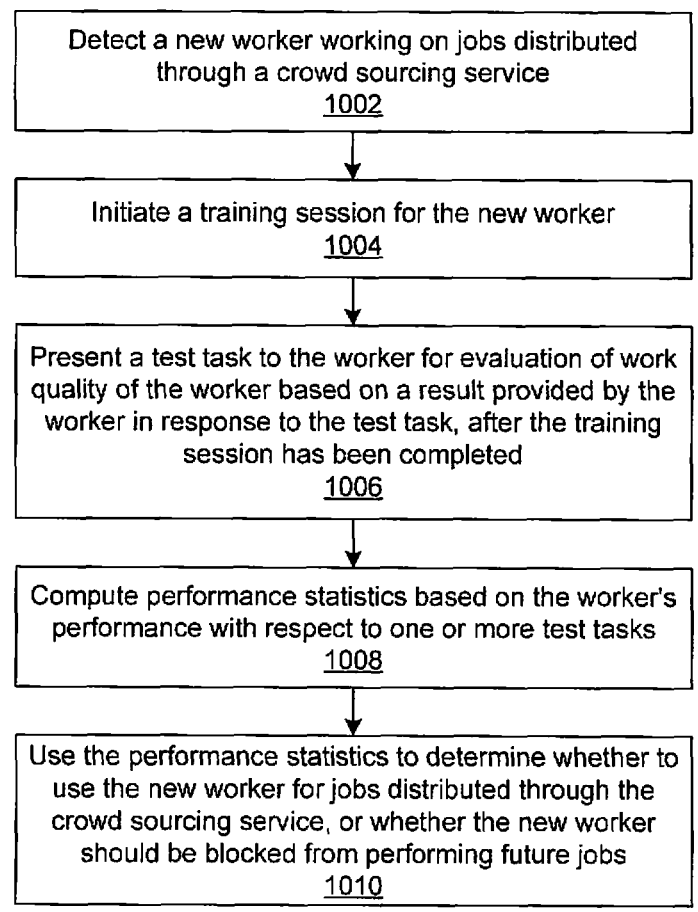
FIG. 10 depicts a flow chart illustrating an example process for training and assessing whether a new worker can be used by a crowd sourcing service to perform crowd sourced jobs.

FIG. 10 depicts a flow chart illustrating an example process for training and assessing whether a new worker can be used by a crowd sourcing service to perform crowd sourced jobs.

In process 1002, a new worker working on jobs distributed through a crowd sourcing service is detected.

In process 1004, a training session is initiated for the new worker. In process 1006, after the training session has been completed, a test task is presented to the worker for evaluation of work quality of the worker based on a result provided by the worker in response to the test task. In process 1008, performance statistics are computed based on the worker's performance with respect to one or more test tasks. In addition, performance statistics can be computed for multiple workers that receive jobs through the job distribution service.

In process 1010, the performance statistics are used to determine whether to use the new worker for jobs distributed through the crowd sourcing service, or whether the new worker should be blocked from performing future jobs. the performance statistics can also be used to determine or update a wage for the new worker.

Figure 11:
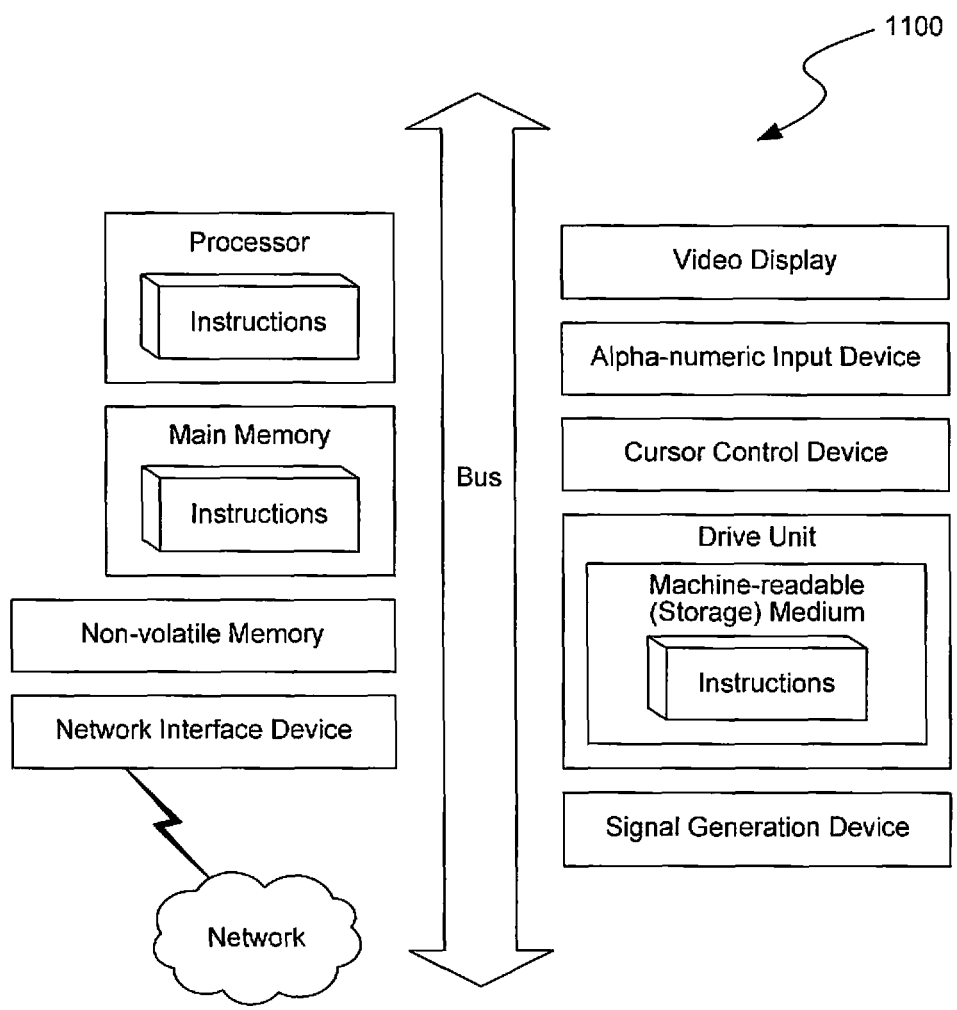
FIG. 11 shows a diagrammatic representation of a machine in the example form of a computer system within which a set of instructions, for causing the machine to perform any one or more of the methodologies discussed herein, may be executed.

FIG. 11 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1100 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method for testing and controlling work quality in crowdsourcing jobs, the method comprising:
    selecting a crowdsourcing job, distributed through a processor based job distribution platform, with a known correct result determined by agreement of different workers;
    generating a test crowdsourcing job by manipulating the known correct result into an incorrect result based on frequently received worker errors;
    presenting the test crowdsourcing job for evaluation to a first worker who is unaware of being evaluated;
    evaluating, by the processor based job distribution platform, work quality of the first worker by determining whether the first worker has identified the test crowdsourcing job as having the inaccurate result that was manipulated from the known correct result;
    controlling, by the processor based job distribution platform, work quality of the first worker, by minimizing repeat views of test crowdsourcing jobs, by the first worker, to a value equal to a ratio of maximum allowed job completeness for the first worker and test adjusted tasks.

2. The method of claim 1, further providing a feedback mechanism to allow the first worker to contest a wrong result when working on the test crowdsourcing job.

3. The method of claim 1, further adjusting a frequency with which the test crowdsourcing jobs are presented to the first worker among other crowdsourcing jobs based on the work quality of the first worker.

4. The method of claim 1, further generating a feedback message.

5. The method of claim 4, wherein, the feedback message is presented to the first worker when the first worker fails to identify the manipulated result as being inaccurate for the test crowdsourcing job.

6. The method of claim 1, further comprising: determining the known correct result from similarities among results provided from the different workers.

7. The method of claim 1, wherein, the test crowdsourcing job includes verification of a URL or verification of a search result generated from a search engine.

8. A system for testing and controlling work quality in crowdsourcing jobs, the system comprising a memory storing a set of computer instructions, which when executed by one or more processors causes the system to:
    select a crowdsourcing job, with a known correct result determined by agreement of different workers;
    generate a test crowdsourcing job by manipulating the known correct result into an incorrect result based on frequently received worker errors;
    present the test crowdsourcing job for evaluation to a first worker who is unaware of being evaluated;
    evaluate, work quality of the first worker by determining whether the first worker has identified the test crowdsourcing job as having the inaccurate result that was manipulated from the known correct result;
    control, work quality of the first worker, by minimizing repeat views of test crowdsourcing jobs, by the first worker, to a value equal to a ratio of maximum allowed job completeness for the first worker and test adjusted tasks.

9. The system of claim 8, further comprising a contested answer manager, which when executed by the one or more processors, allows the first worker to contest a wrong result when working on the test crowdsourcing job.

10. The system of claim 8, further comprising a test data generator which, when executed by the one or more processors, adjusts a frequency with which test crowdsourcing jobs are presented to the first worker among other crowdsourcing jobs based on the work quality of the first worker.

11. The system of claim 8, further comprising a feedback generator, which when executed by the one or more processor, generates a feedback message.

12. The system of claim 11, wherein, the feedback generator presents the feedback message to the first worker when the first worker fails to identify the manipulated result as being inaccurate for the test crowdsourcing job.

13. The system of claim 8, further comprising a data optimization module, which when executed by the one or more processors, determines the known correct result from similarities among results provided from the different workers.

14. The system of claim 8, further comprising an error detector which, when executed by the one or more processors, verifies a URL or a search result generated from a search engine that were provided by the first worker in response to the test crowdsourcing job.

* * * * *